United States Patent
Li et al.

(10) Patent No.: US 9,321,252 B2
(45) Date of Patent: Apr. 26, 2016

(54) LAMINATING DEVICE AND APPARATUS HAVING THE SAME

(71) Applicant: Industrial Technology Research Institute, Hsinchu (TW)

(72) Inventors: Chang-Chou Li, Tainan (TW); Chin-Lung Liu, Kaohsiung (TW); Chih-Yu Ke, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 286 days.

(21) Appl. No.: 14/031,609

(22) Filed: Sep. 19, 2013

(65) Prior Publication Data
US 2014/0083616 A1 Mar. 27, 2014

(30) Foreign Application Priority Data
Sep. 21, 2012 (TW) .............................. 101134769 A

(51) Int. Cl.
*B32B 37/00* (2006.01)
*B32B 41/00* (2006.01)

(52) U.S. Cl.
CPC ............. *B32B 37/0053* (2013.01); *B32B 41/00* (2013.01); *B32B 2309/12* (2013.01)

(58) Field of Classification Search
CPC .. B32B 37/0053; B32B 37/10; B32B 38/004; B32B 41/00; B32B 2309/12
USPC ................................ 156/358, 555, 582, 583.1
See application file for complete search history.

(56) References Cited

U.S. PATENT DOCUMENTS

| 5,810,965 A | 9/1998 | Fwu |
| 5,873,965 A * | 2/1999 | Greller .................... B29C 65/20 156/358 |

(Continued)

FOREIGN PATENT DOCUMENTS

| CN | 102107549 A | 6/2011 |
| CN | 102259457 A | 11/2011 |

(Continued)

OTHER PUBLICATIONS

Zhang, Hao, et al., "A Roll-to-Roll Photolithography Process for Establishing Accurate Multilayer Registration on Large Area Flexible Films", Journal of Display Technology, Nov. 2010, pp. 571-578, vol. 6, No. 11.

(Continued)

*Primary Examiner* — George Koch
(74) *Attorney, Agent, or Firm* — Muncy, Geissler, Olds & Lowe, P.C.

(57) ABSTRACT

A laminating device for laminating at least one flexible substrate includes a frame, a pressing module, a driving module, a pressure sensor and a control module. The pressing module is disposed on the frame. The pressing module at least includes a first roller and a second roller which are used for moving relative to each other. The driving module is connected to the first roller for driving the first roller. The pressure sensor is disposed on one side of the second roller and opposite to the first roller for detecting a pressure of the pressing module. The control module is electronically connected to the pressure sensor and the driving module for ordering the driving module to adjust the position of the first roller based on the difference between the pressure detected by the pressure sensor and a predetermined pressure.

19 Claims, 13 Drawing Sheets

(56) References Cited

U.S. PATENT DOCUMENTS

| | | | |
|---|---|---|---|
| 6,026,884 A * | 2/2000 | Spitko | B32B 37/0053 100/334 |
| 7,324,264 B2 | 1/2008 | Aylward et al. | |
| 7,432,009 B2 | 10/2008 | Ripley et al. | |
| 2010/0107694 A1 | 5/2010 | Dannoux et al. | |
| 2011/0030569 A1 * | 2/2011 | Boudreau | B41F 9/003 101/216 |
| 2011/0177347 A1 | 7/2011 | Tomamoto et al. | |
| 2011/0192878 A1 | 8/2011 | Teranishi et al. | |
| 2012/0047951 A1 | 3/2012 | Dannoux et al. | |

FOREIGN PATENT DOCUMENTS

| | | |
|---|---|---|
| CN | 102498076 A | 6/2012 |
| TW | 431440 | 4/2001 |
| TW | 201002503 A | 1/2010 |
| TW | 201119930 A | 6/2011 |

OTHER PUBLICATIONS

Soh, Y.C, et al., "Large area roller embossing of multilayered green ceramic substrates", SIMTech technical reports, Jul.-Sep. 2009, pp. 180-185, vol. 10, No. 3.

Li, Chang-Chou, et al., "The Technology of Flexible LC Display Cell Packaging in Atmosphere", Journal of Mechatronics Industry, Industrial Technology Research Institute, Oct. 2008, pp. 45-47, vol. 307.

Li, Chang-Zhou, "Lamination Technique of Touch Panel", Measurement Information, Jul. 2011, pp. 34-38, No. 140.

Liu, Jin-Long, et al., "The Study of Flexible Electronics Lamination Technology", Machinery Industry Magazine, Jun. 2011, pp. 47-49, vol. 47.

* cited by examiner

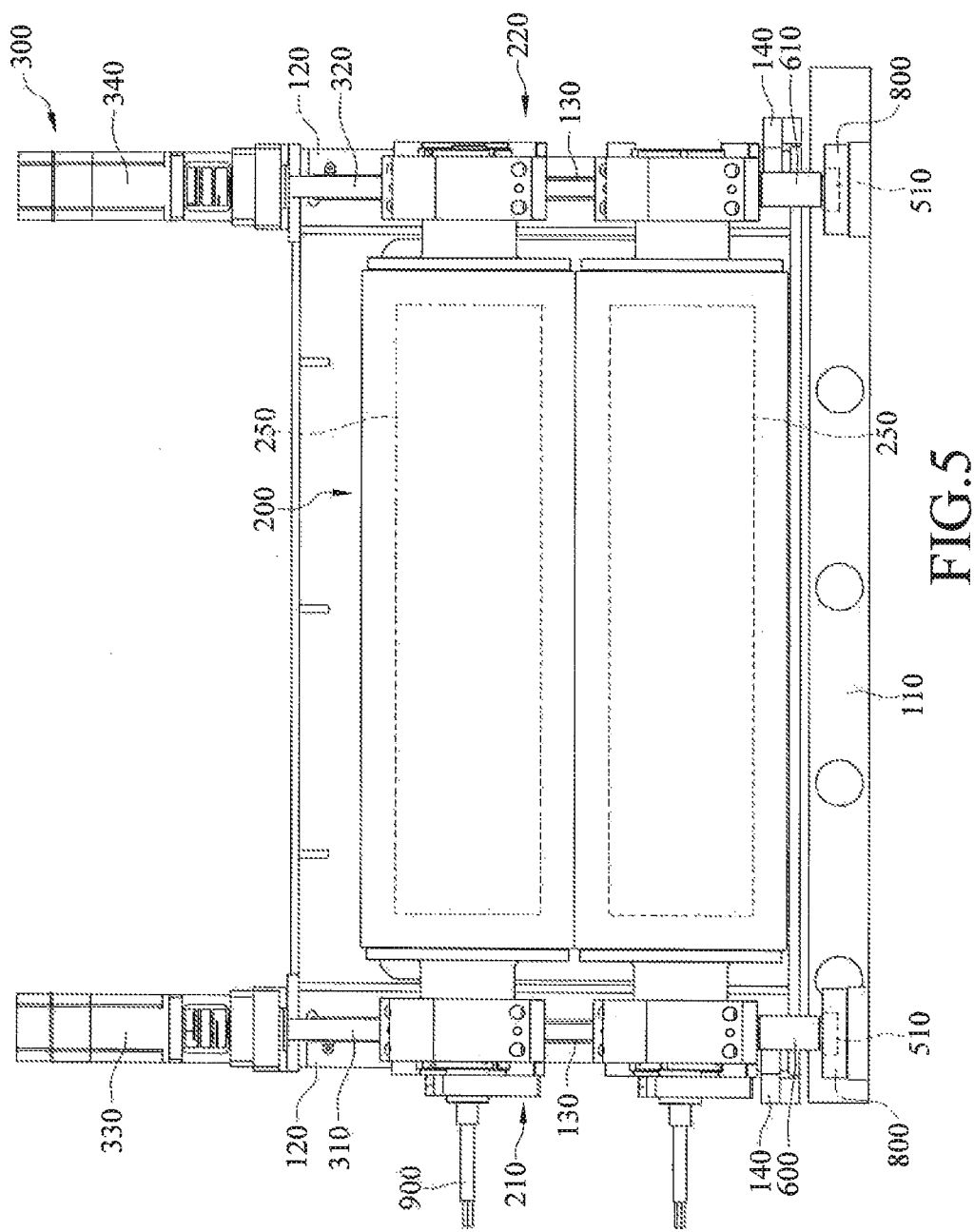

LAMINATING DEVICE AND APPARATUS HAVING THE SAME

CROSS-REFERENCE TO RELATED APPLICATIONS

This non-provisional application claims priority under 35 U.S.C. §119(a) on Patent Application No(s). 101134769 filed in Taiwan, R.O.C. on 2012 Sep. 21, the entire contents of which are hereby incorporated by reference.

TECHNICAL FIELD

The disclosure relates to a laminating device.

BACKGROUND

Nowadays consumer products are constantly developed for satisfying people's requirements. Flexible electronics, in particular, promote the development of the new industries due to its flexibility. Generally speaking, the application of flexible electronics includes flexible sensors, flexible displays, organic light emitting diode lighting, etc.

The flexible substrate is one of the components of flexible electronics. Except for flat plastic substrates and the sheet metal which are normally used, the flexible glass substrate, whose thickness is reduced to make it flexible, can also be used in flexible electronics. The flexible glass substrate features in flexibility, high hardness, good translucence, stability and being high temperature resistant. Being high temperature resistant, in particular, make the flexible glass substrate be more applicable in the manufacturing processes of flexible electronics.

For instance, the manufacturing processes of flexible displays require a process for lamination of photoresist layers, protective films, display layers or other flexible materials with the flexible substrate. In the lamination processes, it often needs to press the material with rollers with high temperature. However, rollers are easily affected by high temperature, reducing the stability of the material regarding the press between the rollers. In addition, the cylindrical shape of rollers may be slightly deformed in the long run, so the uneven surface of the rollers leads to cracks and depressions on flexible substrates, display layers disposed on the flexible substrates and electronic devices disposed on the flexible substrates during the manufacturing processes. As for the flexible glass, these cracks and depressions result in stress concentration which reduces the structural strength of the flexible glass, thereby lowering the yield rate of the manufacturing of the components of the flexible electronics. As a result, how to improve the stability regarding the press of two rollers is a crucial issue for related researchers to overcome.

SUMMARY

A laminating device for laminating at least one flexible substrate comprising a frame, a pressing module, a driving module, a pressure sensor and a control module. The pressing module is disposed on the frame. The pressing module at least comprises a first roller and a second roller which are configured for moving relative to each other. The driving module is connected to the first roller for driving the first roller. The pressure sensor is disposed on one side of the second roller and opposite to the first roller for detecting a pressure of the pressing module. The control module is electronically connected to the pressure sensor and the driving module for ordering the driving module to adjust the position of the first roller based on the difference between the pressure detected by the pressure sensor and a predetermined pressure.

Moreover, a laminating apparatus configured for laminating at least one flexible substrate comprising a placing device, a receiving device and a laminating device. The placing device and the receiving device are configured for carrying the opposite ends of the at least one flexible substrate respectively, and are configured for moving the at least one flexible substrate from the placing device to the receiving device. The laminating device is disposed between the placing device and the receiving device and configured for laminating at least one flexible substrate. The laminating device comprises a frame, a pressing module, a driving module, a pressure sensor and a control module. The pressing module is disposed on the frame. The pressing module at least comprises a first roller and a second roller which are configured for moving relative to each other. The driving module is connected to the first roller for driving the first roller. The pressure sensor is disposed on one side of the second roller and opposite to the first roller for detecting a pressure of the pressing module. The control module is electronically connected to the pressure sensor and the driving module for ordering the driving module to adjust the position of the first roller based on the difference between the pressure detected by the pressure sensor and a predetermined pressure.

BRIEF DESCRIPTION OF THE DRAWINGS

The disclosure will become more fully understood from the detailed description given herein below and the drawings are for illustration only, and thus do not limit the present disclosure, wherein:

FIG. 5 is a front view of FIG. 3;

DETAILED DESCRIPTION

Figure 1:
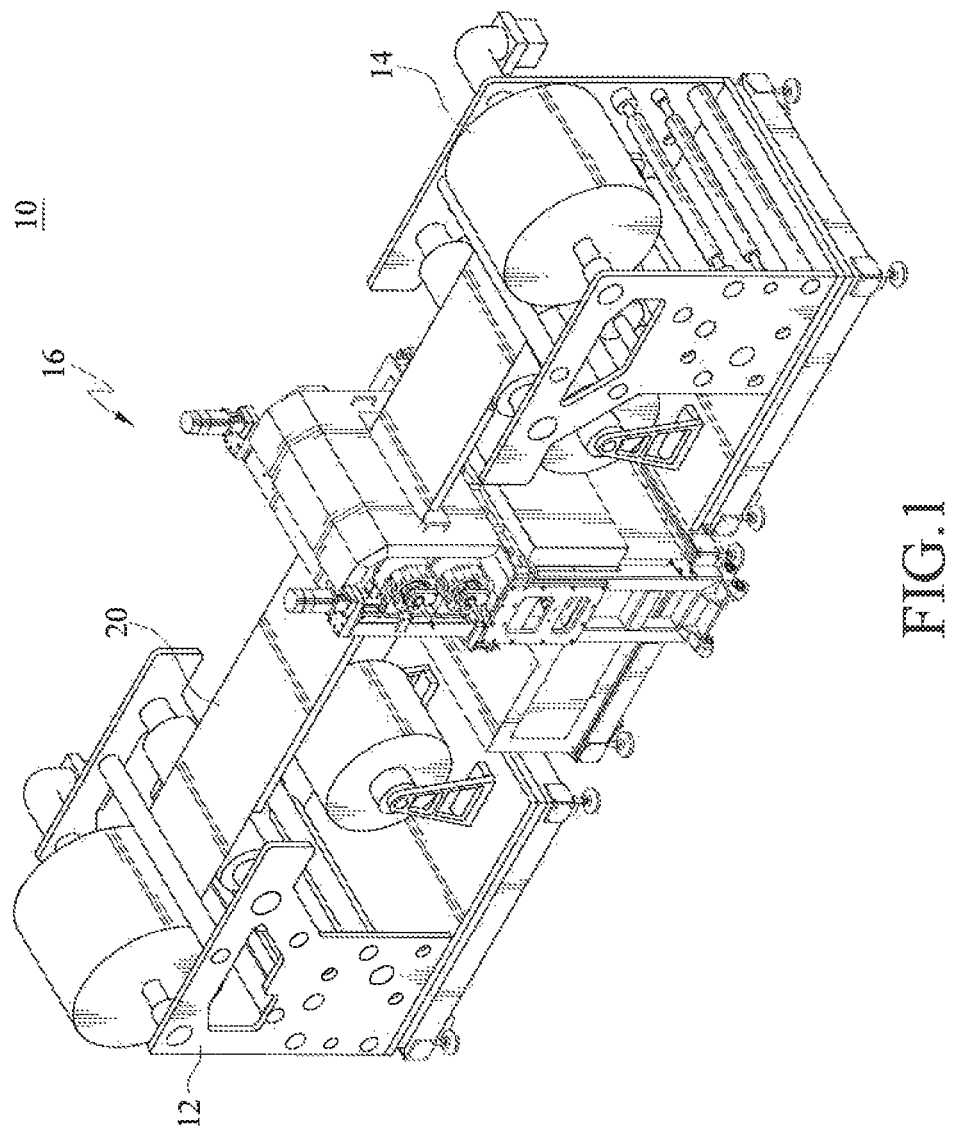
FIG. 1 is a perspective view of a laminating apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
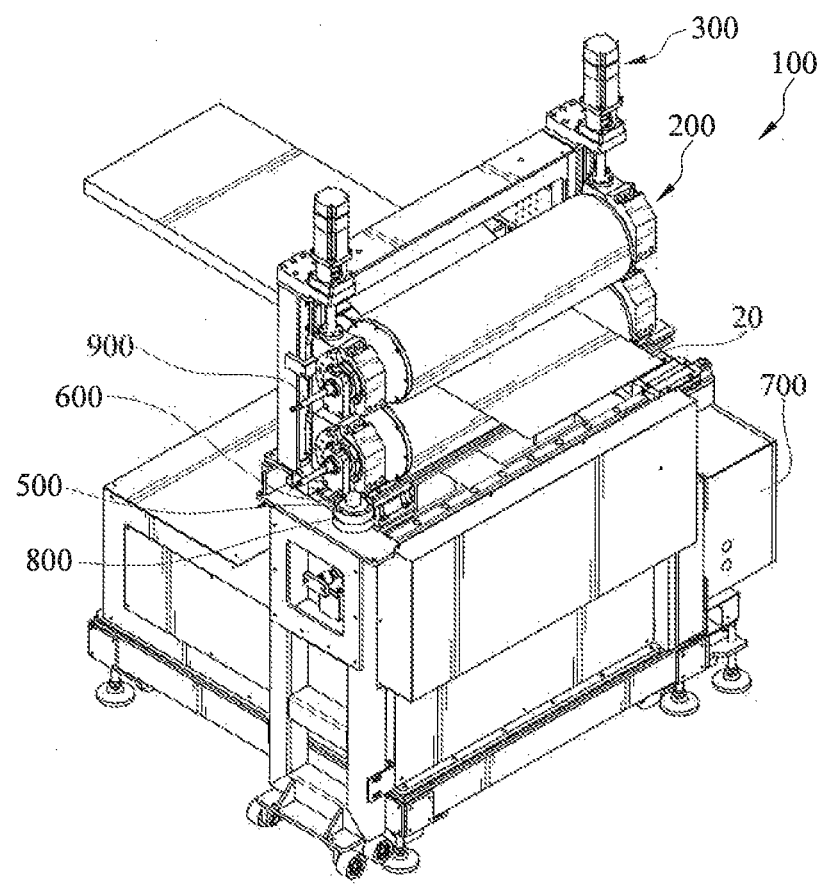
FIG. 2 is a perspective view of a laminating device in FIG. 1.
Figure 3:
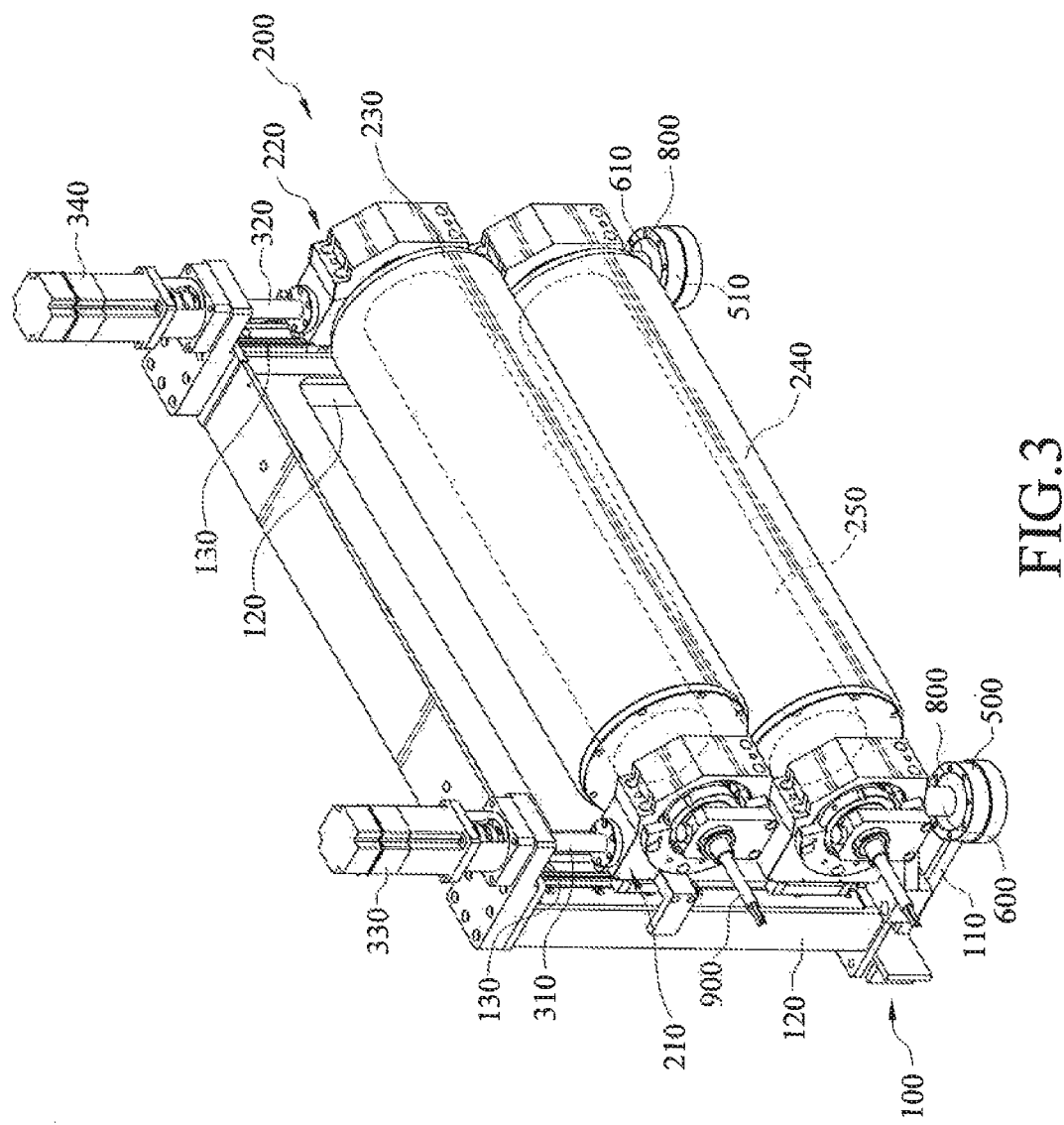
FIG. 3 is partially enlarged view of FIG. 2.
Figure 4A:
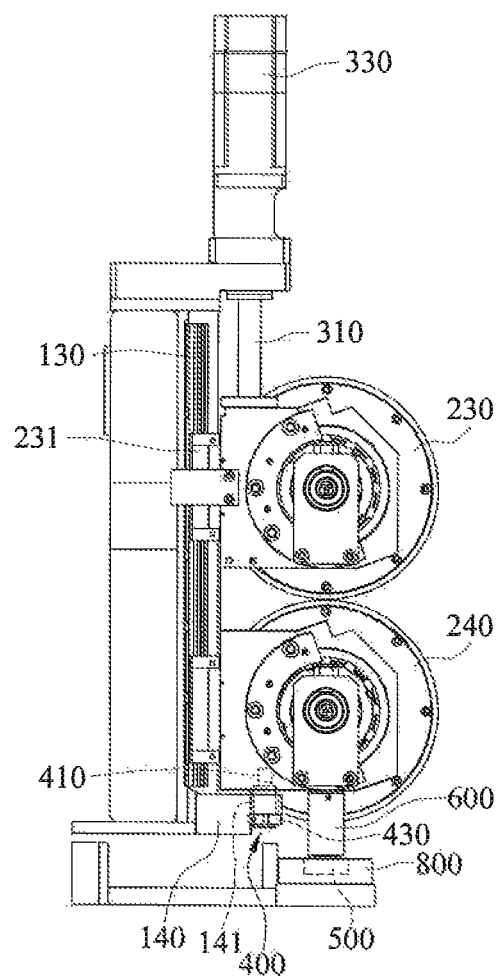
FIG. 4A is a side view of FIG. 3.
Figure 4B:
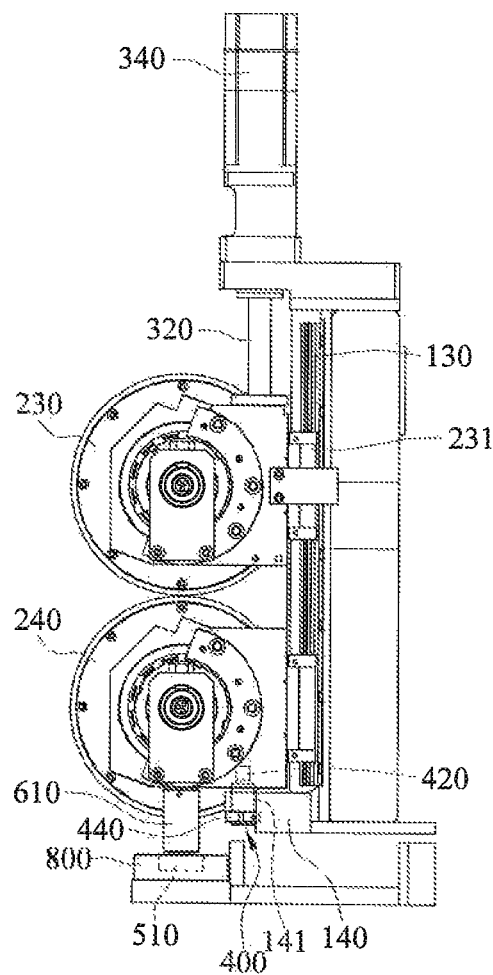
FIG. 4B is a side view of another side of FIG. 3.

FIG. 1 is a perspective view of a laminating apparatus according to an embodiment of the disclosure; FIG. 2 is a perspective view of a laminating device in FIG. 1; FIG. 3 is partially enlarged view of FIG. 2; FIG. 4A is a side view of FIG. 3; FIG. 4B is a side view of another side of FIG. 3; FIG. 5 is a front view of FIG. 3. As seen in FIG. 1 to FIG. 5, a laminating apparatus 10 of this embodiment is for laminating at least one flexible substrate 20. In this embodiment, the number of the flexible substrate 20 is two, but the disclosure is not limited thereto. In other embodiments, the number of the flexible substrate 20 may be one, three or more. Additionally, in this embodiment, the flexible substrate 20 refers to flexible glass. The thickness of the flexible glass can be as low as a number below several hundred micrometers and the flexible glass can be bent with a bending radius below tens of centimeters. The flexible glass can even be rolled and be transferred by roll-to-roll manner with assistance of rollers.

The laminating apparatus 10 comprises a placing device 12, a receiving device 14 and a laminating device 16. The placing device 12 and the receiving device 14 are for supporting the opposite ends of the flexible substrate 20 respectively, and for moving the flexible substrate 20 from the placing device 12 to the receiving device 14. The laminating device 16 is disposed between the placing device 12 and the receiving device 14 for laminating the at least one flexible substrate 20. The laminating device 16 comprises a frame 100, a pressing module 200, a driving module 300, a first pressure sensor 500, a second pressure sensor 510 and a control module 700. Furthermore, the laminating device 16 further comprises an adjustment element 400, a first support element 600 and a second support element 610.

The frame 100 comprises a base 110, two stands 120, two rails 130 and two connection blocks 140. The two stands 120 are respectively erected on the base 110 and are separated apart by a distance. The two rails 130 are installed on the stand 120, respectively. Each of the connection blocks 150 has a through hole 141.

The pressing module 200 is installed on the stand 100. In this embodiment, the pressing module 200 has a first side 210 and a second side 220 that are opposite to each other. Additionally, the pressing module 200 comprises a first roller 230 and a second roller 240. The second roller 240 is disposed on the frame 100, while each opposite ends of the first roller 230 has a sliding block 231. The two sliding blocks are installed on the two rails 130 respectively for enabling the first roller 230 to approach or to move away from the second roller 240 in order to laminate the flexible substrate 20 with different thickness. Although the sliding block 231 in this embodiment is installed on the rail 130 to guide the path, this is not intended to limit the disclosure. In other embodiments, for example, a guide sleeve may be sleeved around a post or a sliding member is installed on a groove to guide the path.

In this and some other embodiments, the pressing module may further comprise a heat source 250. In this embodiment, the heat source 250 is in thermal contact with the first roller 230 and the second roller 240, but the disclosure is not limited thereto. In other embodiments, the heat source 250 may just be in thermal contact with one of the first roller 230 and the second roller 240. The heat source 250 of this embodiment may be an electric heating fluid or a preheat fluid. The preheat fluid can be a medium such as water, oil or air.

The driving module 300 is installed on the frame 100 and is connected to the first roller 230 for driving the first roller 230 to approach or to move away from the second roller 240. Specifically, the driving module 300 comprises a first telescoping member 310, a second telescoping member 320, a first driving motor 330 and a second driving motor 340. The first driving motor 330 and the second driving motor 340 are respectively installed on ends of two stands 120 away from the base 110. The first telescoping member 310 is located between the first driving motor 330 and the first roller 230, and is in contact with the first driving motor 330 and the first roller 230. The second telescoping member 320 is located between the second driving motor 340 and the first roller 230, and is in contact with the second driving motor 340 and the first roller 230. Moreover, the first telescoping member 310 and the second telescoping member 320 can be telescoping rods, while their length can be modified via the first driving motor 330 and the second driving motor 340. The relative position of the first telescoping member 310 and the second telescoping member 320 is defined for the convenience of description. In this embodiment, the first telescoping member 310 and the first driving motor 330 are near the first side 210 of the pressing module 200, while the second telescoping member 320 and the second driving motor 340 are near the second side 220 of the pressing module 200.

The adjustment element 400 is installed on the two opposite ends of the second roller 240 for adjusting the position of the second roller 240 relative to the first roller 230. In this embodiment, the adjustment element 400 is for moving the second roller 240 upward to approach the first roller 230 or to move it downward to be away from the first roller 230. Specifically, the adjustment element 400 is used for adjusting the pressures (or the weights) of the two opposite sides of the second roller 240, and it can adjust one side, or two sides at the same time when needed. Thereby, the pressures of the two opposite sides of the second roller 240 are equal, so that the left side and the right side of the flexible substrate 20 are forced evenly. Specifically, the adjustment element 400 comprises a first connection rod 410, a second connection rod 420, a first adjustment element 430 and the second adjustment element 440. The first connection rod 410 and the first adjustment element 430 are located near the first side 210 of the pressing module 200, while the second connection rod 420 and the second adjustment element 440 are located near the second side 220 of the pressing module 200. One end of the first connection rod 410 contacts the second roller 240, the other end thereof runs through the through hole 141 of the connection block 140 from the second roller 240 along a direction towards base 110. The first adjustment element 430 is locked with the first connection rod 410 and abuts against the surface of the connection block 140 which faces the base 110. Similarly, the arrangements of the second connection rod 420 and the second adjustment element 440 are the same as those of the first connection rod 410 and the first adjustment element 430, so those will not be illustrated again. Except for the aforementioned first connection rod 410 and second connection rod 420, an elastic element can also be utilized. In this embodiment, the first adjustment element 430 or the second adjustment element 440 can be an adjustment nut. Furthermore, the first connection rod 410 and the second connection rod 420 penetrate the through hole 141 of the connection block 140 and are locked into the adjustment element 430, but this manner is not intended to limit the disclosure. That is, it can be done by the connection between a screw and a nut, or by the connection between a screw and a screw thread for adjusting the position of the second roller 240 relative to the first roller 230.

The first pressure sensor 500 and the second pressure sensor 510 are respectively installed on the base 110. The first pressure sensor 500 is near the first side 210 of the pressing module 200, while the second pressure sensor 510 is near the second side 220 of the pressing module 200.

The first support element 600 is near the first side 210 of the pressing module 200, while the second support element 610 is near the second side 220 of the pressing module 200. Additionally, the first support element 600 is disposed on the first pressure sensor 500 and is in contact with the second roller 240. Specifically, the first support element 600 is in contact with both the second roller 240 and the first pressure sensor 500 for being a medium of the pressure transmission, so that the first pressure sensor 500 is configured for detecting a first pressure value between the first roller 230 and the second roller 240 on the first side 210 of the pressing module 200.

Similarly, the second support element 610 is disposed on the second pressure sensor 510 and is in contact with the second roller 240. Specifically, the second support element 610 is in contact with both the second roller 240 and the second pressure sensor 510 for being a medium of the pressure transmission, so that the second pressure sensor 510 is configured for detecting a first pressure value between the first roller 230 and the second roller 240 on the second side 220 of the pressing module 200.

In this embodiment, each pressure sensor can be away from the heat source 250 via the support element 600 and 610 (that is, the support element 600 and 610 separate pressure sensors and the heat source 250 by a distance), thereby improving the accuracy of each pressure sensor. The support element 600 and 610 can be insulators with low thermal conductivity to enhance heat isolation.

The control module 700 is electronically connected to the first pressure sensor 500, the second pressure sensor 510, the first driving motor 330 and the second driving motor 340. The first pressure sensor 500 transmits the first pressure value to the control module 700, and the control module 700 is configured for comparing the first pressure value to a predetermined pressure value. Then, the control module 700 make the first driving motor 330 adjust the relative position of the first roller 230 and the second roller 240 on the first side 210 of the pressing module 200 based on the difference between the first pressure value and the predetermined pressure value. Similarly, the second pressure sensor 510 transmits the second pressure value to the control module 700, and the control module 700 compares the second pressure value to a predetermined pressure value. Subsequently, the control module 700 make the second driving motor 340 adjust the relative position of the first roller 230 and the second roller 240 on the second side 220 of the pressing module 200 based on the difference between the first pressure value and the predetermined pressure value. The foregoing predetermined pressure value can vary based on required pressure values of different flexible substrates 20.

In this and some other embodiments, the laminating apparatus 10 further comprises two insulators 800. The two insulators 800 are disposed on the first pressure sensor 500 and the second pressure sensor 510 respectively. Namely, the two insulators 800 separate the first pressure sensor 500 and the second pressure sensor 510 from the first roller 230 and the second roller 240 respectively, thereby preventing the heat of the first roller 230 or that of the second roller 240 from transferring to each pressure sensor.

In this and some other embodiments, the laminating apparatus 10 further comprises a temperature sensor 900. The temperature sensor 900 is at least in thermal contact with the first roller 230 and the second roller 240. The temperature sensor 900 is electrically connected to the control module 700 and the heat source for returning the temperature of the first roller 230 or that of the second roller 240 to the control module 700.

Figure 6A:
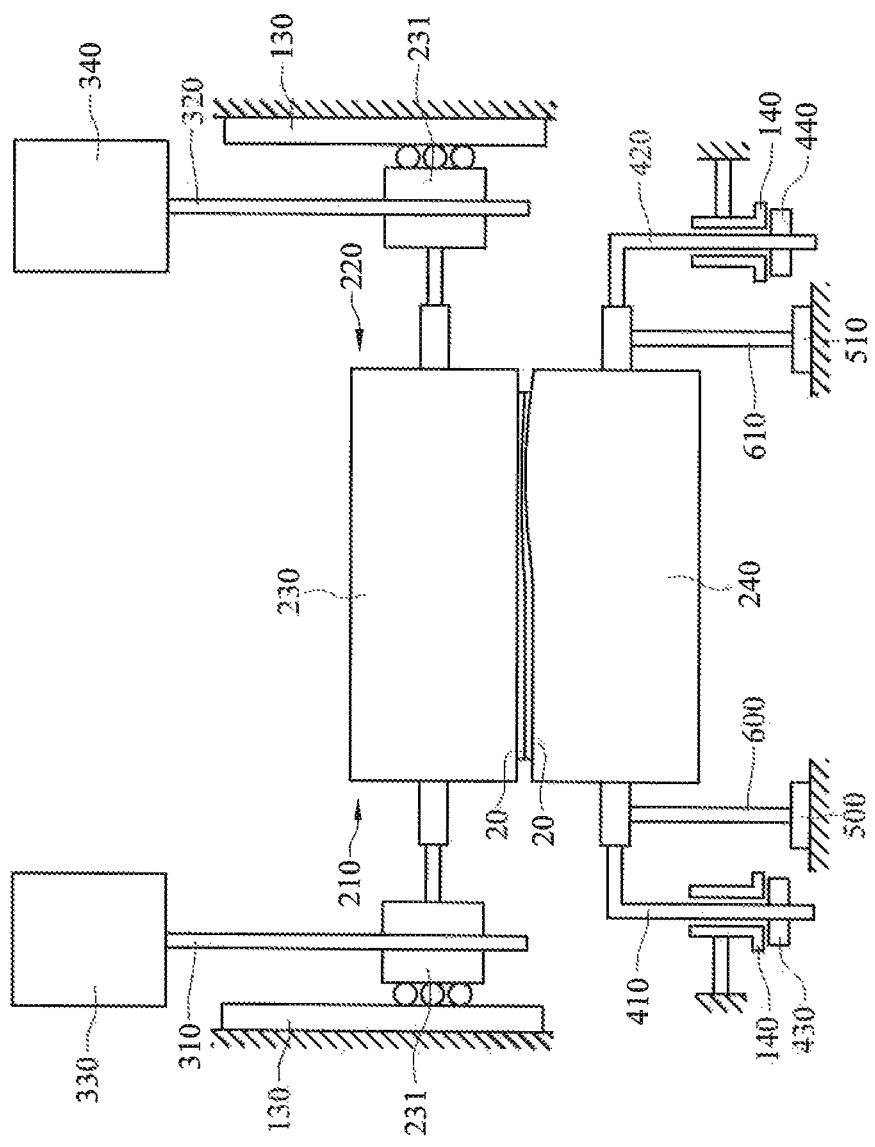
FIG. 6A and FIG. 6B are schematic views of the usage of an adjustment element in FIG. 3.

The use of the laminating apparatus 10 will be illustrated hereinafter. As seen in FIG. 2 to FIG. 4B and FIG. 6A to FIG. 6B, before the lamination of the flexible substrate 20, the laminating apparatus 10 can move the first roller 230 via the first telescoping member 310 and the second telescoping member 320, so that the first roller 230 and the second roller 240 are separated from each other and the initial pressure values of the rollers are read via the first pressure sensor 500 and the second pressure sensor 510. The deviation of the cylindrical shape of the rollers, the driving mechanism of the roller(s) installed on the single side or the heat sources inside the roller all can easily affect the initial pressure values of the two ends of the roller. Hence, the first adjustment element 430 and the second adjustment element 440 can be modified based on the difference between the pressure values, thereby improving the stability of the forces of the two sides of the roller and mitigate the tilt caused by the different forces from the two sides of the roller. As a result, the evenness of the pressure during the lamination by the rollers can be improved. As seen in FIG. 6A, before the lamination of the flexible substrate 20, the initial pressure values of the two ends of the second roller 240 may be different after separating the first roller 230 from the second droller 240. When the second pressure sensor 510 reads a pressure value higher than that read by the first pressures sensor 500, the locking tightness of the first adjustment element 430 with the first connection rod 410, for example, can be adjusted to be increased for making the pressure values read by the first pressures sensor 500 and the second pressure sensor 510 be converged to be the same by applying a pre-pressure.

Figure 6B:
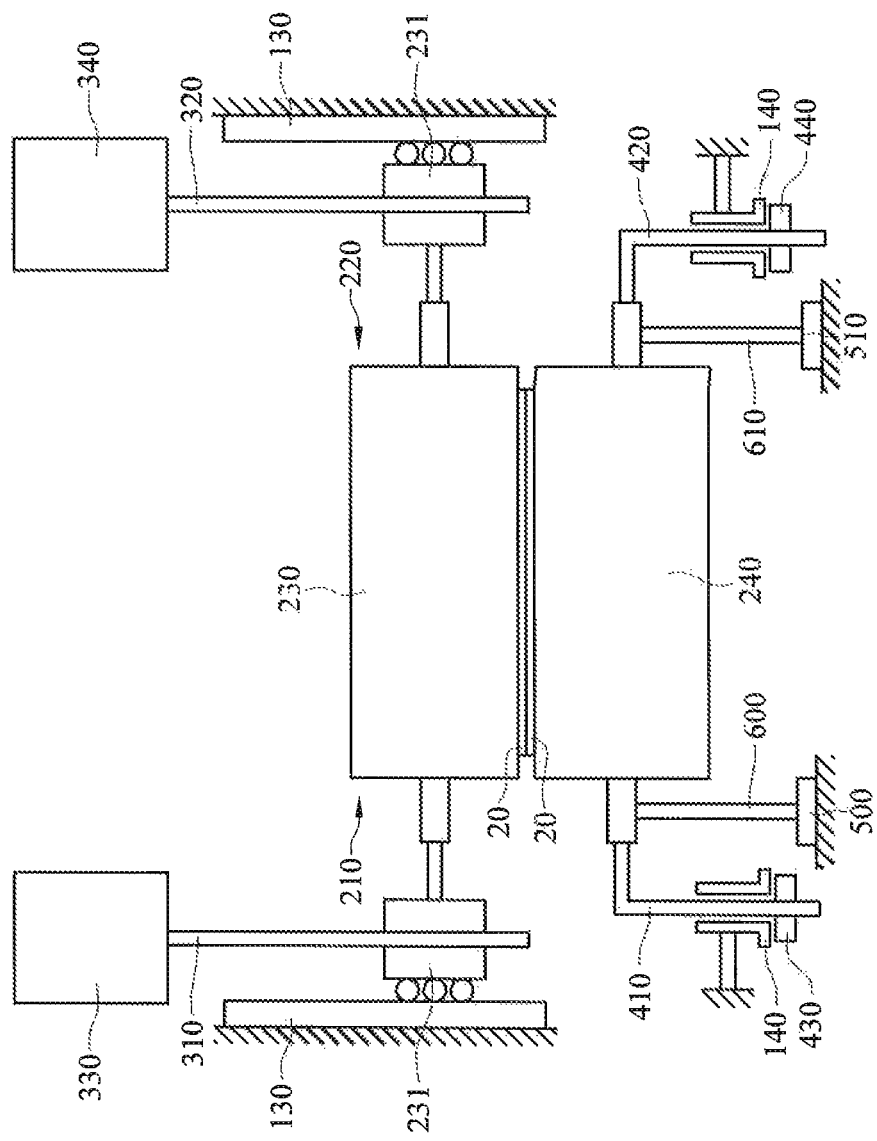

Before the lamination of the flexible substrate 20, the laminating apparatus 10 may perform one or several times of pre-laminations for correcting the relative position of the first roller 230 and the second roller 240, so as to make the pressure value between the first roller 230 and the second roller 240 nearer the predetermined pressure value. This is to improve the yield rate of production of the flexible substrate 20. For instance, in FIG. 6A, the second roller 240 is affected by the high temperature of the heat source 250 so that a convex occurs at a place near the second side 220 of the pressing module 200. This convex can cause a dent on the flexible substrate 20 or even break the flexible substrate 20 when utilizing the first roller 230 and the second roller 240 to laminate the flexible substrate 20, thereby reducing the yield rate of the production of the flexible substrate 20. Therefore, slightly adjusting the position of the first roller 230 and the second roller 240 near the second side 220 of the pressing 200 can make the second pressure value, between the first roller 230 and the second roller 240 and near the second side 220 of the pressing module 200, conform to the predetermined pressure value. Precisely, users may tighten the second adjustment element 440 for forcing the second side 220 of the second roller 240 near the pressing module 200 to move along a direction oppositely away from the first roller 230 (as shown in FIG. 6B).

Figure 7A:
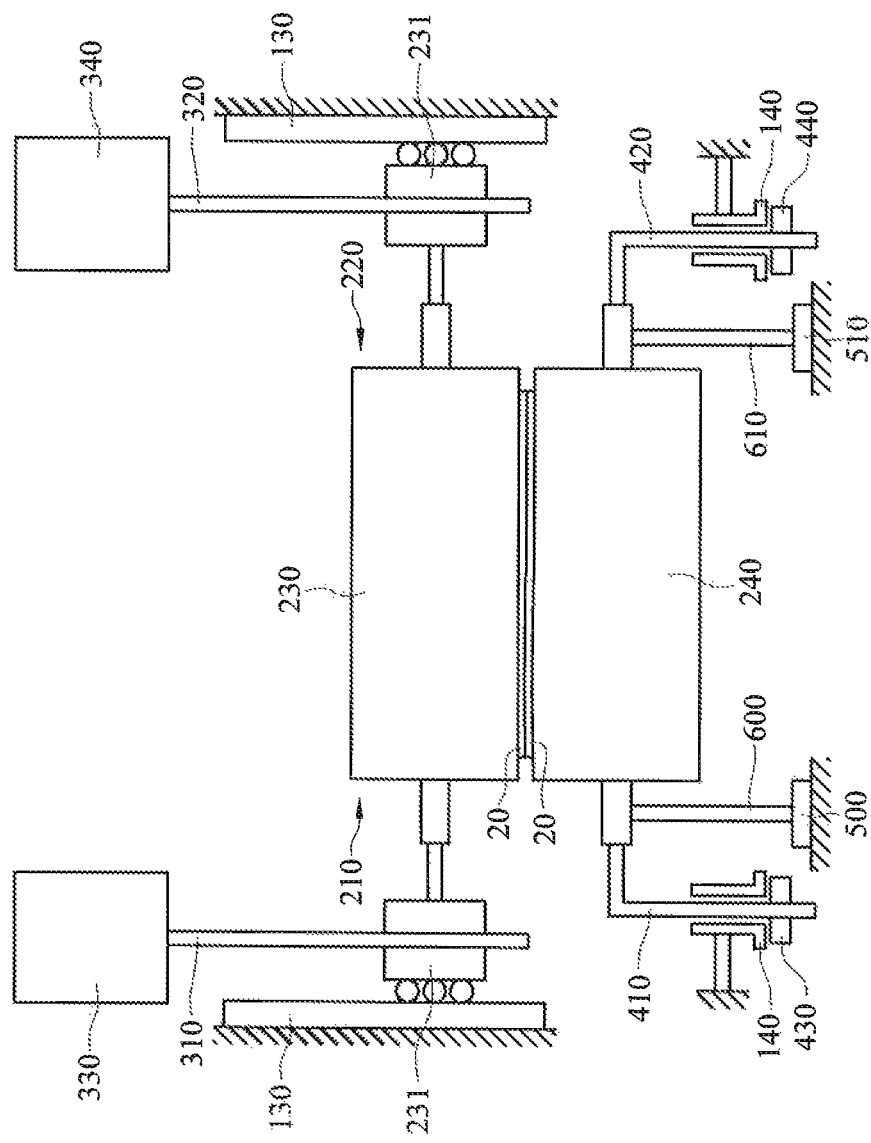
FIG. 7A and FIG. 7B are schematic views of the usage of an driving module in FIG. 3.
Figure 7B:
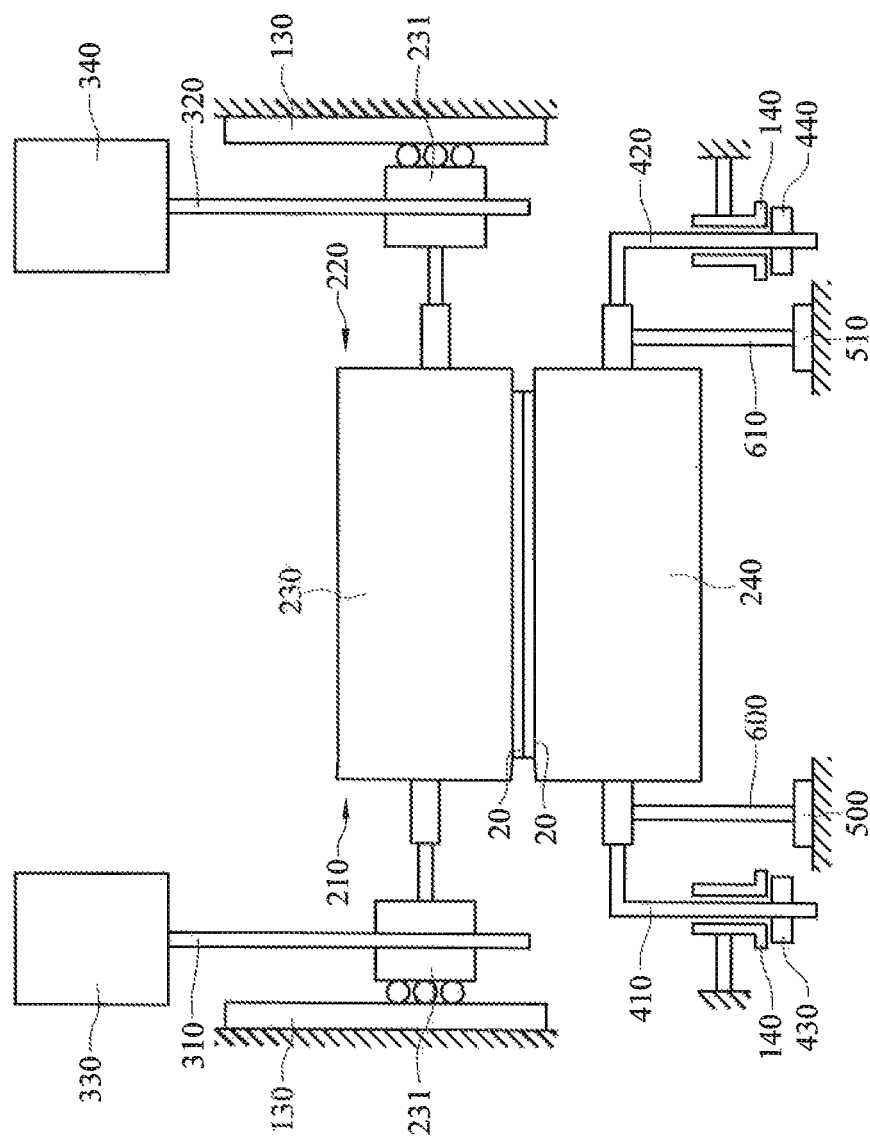

FIG. 7A and FIG. 7B are schematic views of the usage of an driving module in FIG. 3. As seen in FIG. 7A to FIG. 7B, after the laminating apparatus 10 starts laminating the flexible substrate 20, the first roller 230 and the second roller 250 may still be subject to the high temperature of the heat source 250 and therefore generate uneven surface thereon. Additionally, uneven thickness of the flexible substrate 20, uneven cylindrical shape of the rollers or foreign bodies on the bonding surface can cause uneven local stresses of the rotational place of the first roller 230 and the second roller 240 during the rotation. These uneven local stresses can cause unexpected dents on the flexible substrate 20, thereby reducing the yield rate of the production of the flexible substrate 20. Consequently, when the first roller 230 and the second roller 240 generate uneven local stresses during the rotation, the control module 700 make the driving module 300 adjust the relative position of the first roller 230 and the second roller 240 automatically based on the pressure value detected by each pressure sensor. For example, as seen in FIG. 7A, the second roller 240 is affected by the high temperature of the heat source 250 so that a convex occurs at the place near the second side 220 of the pressing module 200. Since the control module 700 is configured for making the driving module 300 drive the first driving motor 330 and the second driving motor 340 automatically based on the pressure value detected by each pressure sensor. During the lamination process of the flexible substrate 20 by the first roller 230 and the second roller 240, when the rollers rotate and contact the local convex, the first pressure sensor 500 detects that the first pressure value on the second side 220 of the pressing module 200 is greater than the predetermined pressure value. As a result, the control module 700 automatically adjust the relative distance between the first roller 230 and the second roller 240 based on the difference between the first pressure value and the predetermined pressure value (as shown in FIG. 7B). Thereby, parts of the flexible substrate 20 which are on the two sides of the roller can bear the same pressure, so that it can be adjusted to have even stress on every rotation position and improve the yield rate of the lamination of the flexible substrate 20.

Figure 8A:
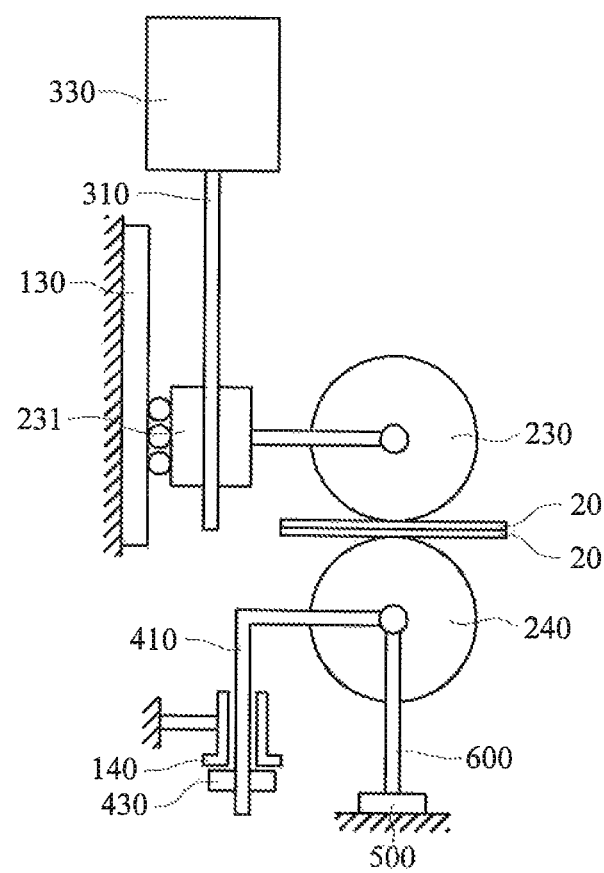
FIG. 8A is a simplified side view of FIG. 3.
Figure 8B:
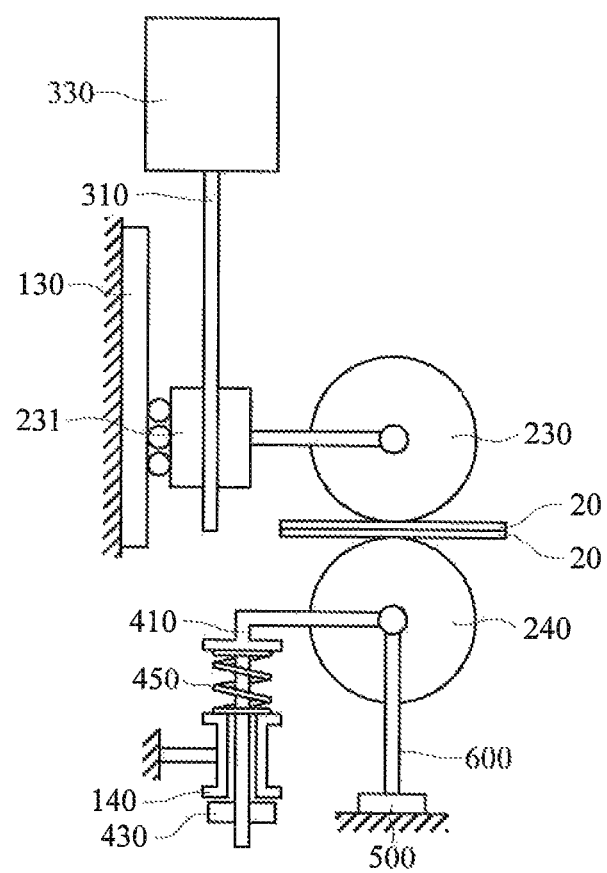
FIG. 8B is a simplified side view of FIG. 3 according to another embodiment of the disclosure.
Figure 8C:
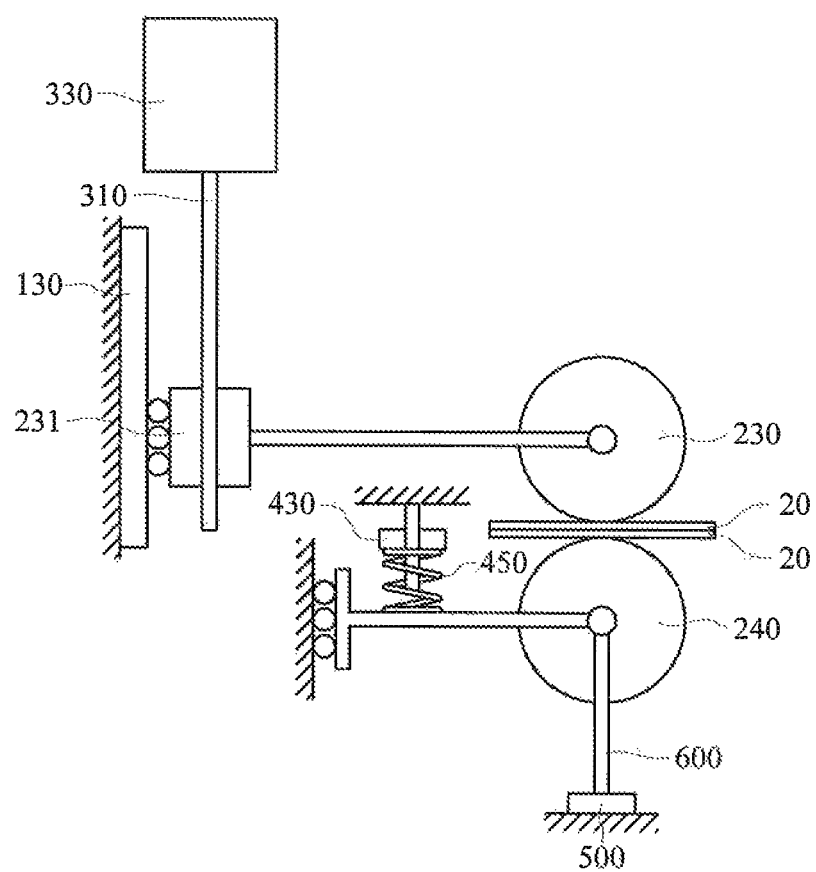
FIG. 8C is a simplified side view of FIG. 3 according to still another embodiment of the disclosure.

FIG. 8A is a simplified side view of FIG. 3; FIG. 8B is a simplified side view of FIG. 3 according to another embodiment of the disclosure; and FIG. 8C is a simplified side view of FIG. 3 according to still another embodiment of the disclosure. As seen in FIG. 8A, only one side of the pressing module 200 is illustrated. The first roller 230 is movably disposed on the frame 100, while the second roller 240 is connected to the first adjustment element 430 and the connection block 140 via the first connection rod 410, but the disclosure is not limited thereto. As seen in FIG. 8B, an elastic element 450 can be further disposed between the first connection rod 410 and the connection block 140. In other embodiments, the second roller 240 is not limited to be connected to the connection block 140. As seen in the embodiment shown in FIG. 8C, the second roller 240 is movably disposed on the frame 100 and the position of the second roller 240 is modified by the first adjustment element 430 and the elastic element 450.

In the laminating device and the laminating apparatus having the same according to the disclosure, the support element is disposed between the second roller and the pressure sensor, so as to make the pressure sensor be away from the heat source on the second roller (that is, the pressure sensor and the heat source are separated by a distance via the support element). Also, the insulator sleeved around the pressure sensor can prevent the heat of the first roller or that of the second roller from transferring to the pressure sensor.

Furthermore, the adjustment element is connected to the second roller, so that the laminating apparatus can adjust the relative position of the second roller and the first roller during the pre-lamination process. Thereby, the pressure value between the first roller and the second roller is approximately equal to the predetermined pressure value.

Moreover, the laminating apparatus comprises the control module and the driving module. Thus, when receiving the pressure value from the pressure sensor, the control module can make the driving module adjust relative position of the second roller and the first roller, so as to adjust the pressure value between the first roller and the second roller in time.

It will be apparent to those skilled in the art that various modifications and variations can be made to the disclosed embodiments. It is intended that the specification and embodiments be considered as exemplary only, with a true scope of the disclosure being indicated by the following claims and their equivalents.

What is claimed is:

1. A laminating device for laminating at least one flexible substrate, the laminating device comprising:
   a frame;
   a pressing module disposed on the frame, wherein the pressing module at least comprises a first roller and a second roller which are configured for moving relative to each other;
   a driving module connected to the first roller for driving the first roller;
   a pressure sensor disposed on one side of the second roller and opposite to the first roller for detecting a pressure of the pressing module;
   an insulator sleeved around the pressure sensor, so that the pressure sensor is covered in the insulator; and
   a control module electronically connected to the pressure sensor and the driving module for ordering the driving module to adjust the position of the first roller based on the difference between the pressure detected by the pressure sensor and a predetermined pressure.

2. The laminating device according to claim 1, wherein the pressing module further comprises a heat source, and the heat source is at least in thermal contact with the first roller or the second droller.

3. The laminating device according to claim 1, wherein the frame comprises two rails which are separated by a distance, and the two rails are configured for guiding the movement of the first roller and the movement of the second roller.

4. The laminating device according to claim 1, wherein the driving module comprises two telescoping members and two driving motors, each of the two telescoping members has a first end and a second end opposite to each other, the two first ends of the two telescoping members are connected to the opposite ends of the first roller respectively, while the second ends of the two telescoping members are connected to the two driving motors respectively, and the two driving motors are configured for driving the two telescoping members respectively.

5. The laminating device according to claim 1, further comprising a temperature sensor, wherein the temperature sensor is in thermal contact with the first roller and/or the second roller and is electronically connected to the control module and the heat source.

6. The laminating device according to claim 1, further comprising an adjustment element connected to the second roller.

7. The laminating device according to claim 6, wherein two opposite ends of the second roller are both connected to the adjustment element.

8. The laminating device according to claim 6, further comprising a connection rod disposed on the adjustment element.

9. The laminating device according to claim 8, wherein the connection rod further comprises an elastic element.

10. The laminating device according to claim 1, further comprising a support element disposed on the pressure sensor.

11. The laminating device according to claim 6, wherein the adjustment element is a nut.

12. A laminating apparatus configured for laminating at least one flexible substrate, the laminating apparatus comprising:
   a placing device;
   a receiving device, wherein the placing device and the receiving device are configured for carrying the opposite ends of the at least one flexible substrate respectively, and are configured for moving the at least one flexible substrate from the placing device to the receiving device; and
   a laminating device disposed between the placing device and the receiving device and configured for laminating at least one flexible substrate, the laminating device comprising:
   a frame;

a pressing module disposed on the frame, wherein the pressing module at least comprises a first roller and a second roller which are configured for moving relative to each other;

a driving module connected to the first roller, wherein the driving module is configured for driving the first roller;

a pressure sensor disposed on one side of the second roller and opposite to the first roller, wherein the pressure sensor is configured for detecting the pressure of the pressing module;

an insulator sleeved around the pressure sensor, so that the pressure sensor is covered in the insulator; and a control module electronically connected to the pressure sensor and the driving module, the control module is configured for ordering the driving module to adjust the position of the first roller based on the difference between the pressure detected by the pressure sensor and a predetermined pressure.

13. The laminating apparatus according to claim 12, wherein the pressing module further comprises a heat source and the heat source is at least in thermal contact with the first roller or the second droller.

14. The laminating apparatus according to claim 3, wherein the frame comprises two rails which are separated by a distance, and the two rails are configured for guiding the movement of the first roller and the movement of the second roller.

15. The laminating apparatus according to claim 12, wherein the driving module comprises two telescoping members and two driving motors, each of the two telescoping members has a first end and a second end opposite to each other, the two first ends of the two telescoping members are connected to the opposite ends of the first roller respectively, while the second ends of the two telescoping members are connected to the two driving motors respectively, and the two driving motors are configured for driving the two telescoping members respectively.

16. The laminating apparatus according to claim 12, further comprising a temperature sensor, wherein the temperature sensor is in thermal contact with the first roller and/or the second roller, and is electronically connected to the control module and the heat source.

17. The laminating apparatus according to claim 12, further comprising an adjustment element connected to the second roller.

18. The laminating apparatus according to claim 12, further comprising a support element disposed on the pressure sensor.

19. The laminating apparatus according to claim 17, wherein the adjustment element is a nut.

* * * * *